June 27, 1950   J. C. SMILEY, JR   2,512,881
KINGPIN BEARING ASSEMBLY
Filed Oct. 6, 1948
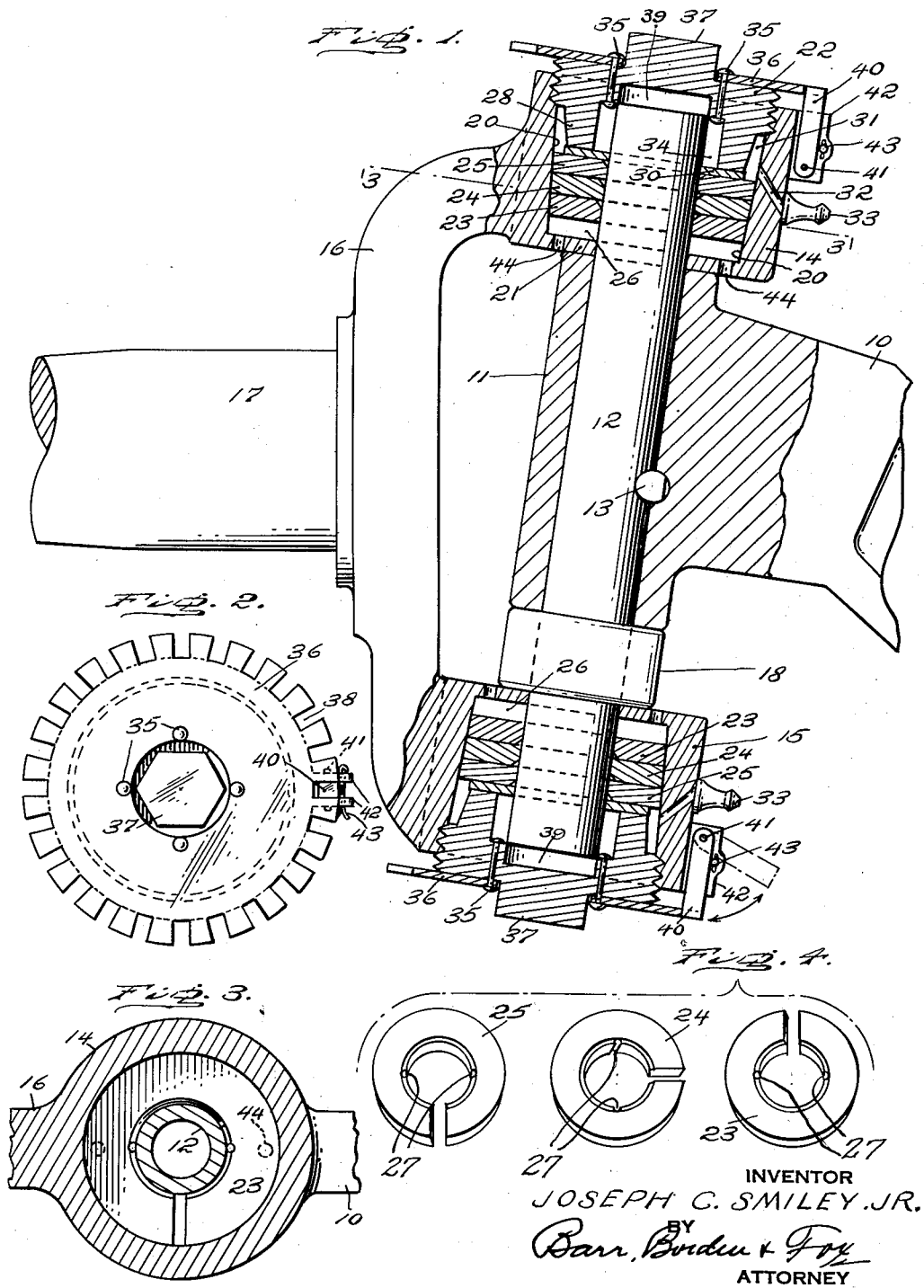
INVENTOR
JOSEPH C. SMILEY, JR.
ATTORNEY Patented June 27, 1950

2,512,881

UNITED STATES PATENT OFFICE 2,512,881

KINGPIN BEARING ASSEMBLY

Joseph C. Smiley, Jr., Philadelphia, Pa., assignor of one-half to Donald T. Wilson, Philadelphia, Pa.

Application October 6, 1948, Serial No. 53,027

6 Claims. (Cl. 308—120)

1

The present invention relates to bearings and more particularly to an adjustable assembly for the king bolt of an automobile.

In the operation of automobiles the king bolts and steering knuckles are so subject to road shocks and steering maneuvers that wear develops relatively rapidly and as a result wheel shimmy takes place with a general lessening of wheel control. In a few instances crude wedge means have been tried as a means to adjust the bearings for wear, but generally such devices have been found impractical. As a result, the wear necessitates the replacement of the king pins and this is not only a laborious undertaking but expensive, as well as loss of the use of the car for hours or days.

Some of the objects of the present invention are: to provide an improved adjustable bearing assembly for king pins of automobiles; to provide a king pin bearing in which wear is reduced to a minimum to thereby give longer bearing life than heretofore possible; to provide an adjustable bearing for king pins which is readily accessible and permits adjustments to be made quickly and without the loss of use of the automobile for more than a few moments; to provide means for adjusting king pin bearings in association with a locking means to retain adjustments when made; to provide a king pin bearing adjusting means, the parts of which can be taken apart and replaced with a minimum loss of time; to provide a novel washer bearing assembly; and to provide other improvements as will hereinafter appear.

In the accompanying drawings, Fig. 1 represents a side elevation of a steering knuckle embodying one form of the present invention, the same being broken away for sectional showing of the novel king pin bearing adjustment; Fig. 2 represents a plan of the lock plate employed for each bearing head; Fig. 3 represents a section on line 3—3 of Fig. 1; and Fig. 4 represents a laterally expanded perspective of the tapered wear take-up washers.

Referring to the drawings, Fig. 1 shows a steering knuckle assembly for one end of an automobile axle 10 which terminates in the usual knuckle 11 through which the king pin 12 passes and is fixed by a key 13. The projecting ends of the king pin 12 are arranged for bearing mounting in the respective heads 14 and 15, which straddle the knuckle 11 and form end parts of the yoke 16 of which the wheel spindle 17 forms a part. A step bearing 18 is interposed between the lower end of the knuckle and the head 15 as is customary in knuckle supports for reducing wear and friction.

Since the novel bearings and wear take-up means are the same in both of the heads 14 and 15, the parts of one only will be described and like parts in the other identified by like reference numerals. The head 14 is in the form of a cup-shaped casing having an inner wall 20 inwardly tapering from a larger diameter at its open end to a smaller diameter at its closed end 21, which latter is centrally apertured to fit snugly about the king bolt 12. Also, the inner wall 20 is threaded at its open end to permit an adjusting pressure ring 22 to be screwed into place to take up wear as it develops between a plurality of bearing washers 23, 24, and 25 of the king pin 12. These washers are formed of bronze or other suitable material and each is in the form of a split ring having outer circumferential faces tapered complemental to the wall 20, and the inner circumferential faces respectively seating against the periphery of the king pin 12. The outer diameter of the innermost ring 23 is such that when assembled in the head 14 it will take an initial operative position spaced from the head end 21. The circumferential space 26 forms a clearance to allow the washer to be adjusted for wear take-up. The washers 24 and 25 are dimensioned to initially contact each other and the washer 23, while also bearing against the king pin 12 and the tapered wall 20. These washers 24 and 25 are successively larger in diameter to ensure proper fit in the large end of the taper. Preferably in the assembly the splits in the respective washers are staggered, and also each has oil grooves 27 therein which are also respectively staggered.

For taking up wear between the aforesaid washers and the king pin 12, the pressure ring 22 is formed with an annular extension 28 projecting into the head for contact with an annular plate 30 which transfers the pressure to the bearing washers. Also, it should be noted that the extension 28 forms an annular space 31, with the wall 20, which communicates with an oil or grease passage 32 controlled by a gun fitting 33. The extension 28 also forms an annular space 34 which provides suitable clearance to permit rivets 35 to be used for attaching a locking plate 36 by which each adjustment is held tight. Also, an axially disposed bore 39 is formed in the inner face of the ring 22 to allow for the required take-up in making adjustments. Axially the plate 36 is apertured for the passage of a nut 37 which is integral with the pressure ring 22 and projects for gripping with a wrench or other tool. The periphery of the plate 36 is provided with a plurality of relatively closely spaced radial notches 38 for interlocking with a latch 40, which is pivoted at 41 to the head 14 so that when swung in one direction it can enter a registering notch 38, and in the opposite direction can be removed from the notch to release the plate 36 for turning movement in making an adjustment. The latch 40 rides in a slotted ear 42 integral with the head 14, which ear is laterally apertured to receive a cotter pin 43. Thus, with the latch 40 in a groove 38 and the cotter pin 43 in place, the parts are locked until such time as a new adjustment is required.

In order to take the bearing assembly apart for any reason, the cotter pin 43 is removed and the latch 40 swung outwardly to release the plate 36, whereupon the nut 37 can be engaged to unscrew and remove the ring 22, whereupon the bearing washers can be removed. To overcome the set wedging action of the washers between the king pin and the wall 20, the end 21 is provided with through holes 44 so that a driving pin can be inserted to release the washers for replacement or repair.

It will now be apparent that a complete unitary king bolt bearing assembly has been devised wherein a steering wheel yoke mounts two wear adjustable bearings, which straddle the axle knuckle at both ends of an automobile axle. By the provision of a split ring construction in association with a wedge means as a part of the bearing head, any wear can be quickly taken up by releasing the adjusting nut latch and turning the nut and its pressure ring to a new position. The closely arranged notches of the ring allow for very close adjustments. It should be noted also that the splits in the bearing washers are out of register when assembled and the head bolt is always in circumferential contact with the bearing formed by the superposed washers. Lubrication is most efficient by reason of the lubricating grooves internally of the washers to which the lubricant is directed by the annular counterbores in the upper face of each washer.

Having thus described my invention, I claim:

1. A king bolt bearing assembly, comprising a cup-shaped head arranged to encircle an end of a king bolt, said head having an inner wall converging towards the closed end of said head, said closed end having an aperture to fit about said king bolt, a split bearing washer also arranged to encircle said bolt and having a periphery complementally tapered to said inner wall, said washer being dimensioned to wedge into place with a clearance from the closed end of said head and having a transverse face, a second split bearing washer seated upon said first washer and similarly shaped and dimensioned for wedging action and having a plane transverse face to seat on said first washer face, and means coacting with said head to press both washers towards said clearance to take up wear, and means to support said head as a part of a wheel yoke and spindle.

2. A king bolt bearing assembly, comprising a cup-shaped head arranged to encircle an end of a king bolt, said head having an inner wall converging towards the closed end of said head, said closed end having an aperture to fit about said king bolt, a split bearing washer also arranged to encircle said bolt and having a periphery complementally tapered to said inner wall, said washer being dimensioned to wedge into place with a clearance from the closed end of said head and having a plane transverse face, a second split bearing washer seated upon said first washer and similarly shaped and dimensioned for wedging action and having a plane transverse face to seat on said first washer face, the split in said second washer being out of register with the split in the first washer, means coacting with said head to press both washers towards said clearance to take up wear, and means to support said head as a part of a wheel yoke and spindle.

3. A king bolt bearing assembly, comprising a head arranged to fit about an end of a king bolt, a plurality of bearing washers arranged to encircle said bolt in superposed relation as a contact bearing, each washer having a split therein and an internal axially disposed groove forming a passage for lubricant, said splits and grooves in assembled condition being out of register, means providing a wedge action between said head and said washers, said means initially locating an end washer with a clearance from said head, and means coacting with said head to press said washers towards said clearance to take up wear.

4. A king bolt bearing assembly, comprising a head arranged to fit about an end of a king bolt, a plurality of bearing washers arranged to encircle said bolt in superposed relation as a contact bearing, each washer having a split therein and an axially disposed groove forming a passage for lubricant, said splits and grooves in assembled condition being out of register, means providing a wedge action between said head and said washers, said means initially locating an end washer with a clearance from said head, means coacting with said head to press said washers towards said clearance to take up wear, and means to introduce lubricant into said head to flow into said grooves.

5. A king bolt bearing assembly, comprising a cup-shaped head, said head having an inner wall converging toward the closed end of said head, said closed end having an aperture to fit about said king bolt, a plurality of plane faced split bearing washers arranged to encircle said bolt in superposed abutting relation as a contact bearing, each washer having a periphery complementally tapered to ride on said inner wall, means including an adjusting ring threaded into said head to form a closure for the open end of said head and to press said washers in a direction to take up wear, and means for locking said ring in any adjusted position.

6. A king bolt bearing assembly, comprising a cup-shaped head, said head having an inner wall converging toward the closed end of said head, said closed end having an aperture to fit about said king bolt, a plurality of plane faced split bearing washers arranged to encircle said bolt in superposed face to face relation as a contact bearing, each washer having a periphery complementally tapered to ride on said inner wall, means including an adjusting ring threaded into said head to form a closure for the open end of said head and to press said washers in a direction to take up wear, said ring having an external periphery provided with notches, and a latch pivoted to said head for selectively engaging said grooves, whereby said ring is locked in any adjusted position.

JOSEPH C. SMILEY, Jr.

REFERENCES CITED

The following references are of record in the file of this patent:

UNITED STATES PATENTS

| Number | Name | Date |
|---|---|---|
| 821,322 | Worrell | May 22, 1906 |
| 1,865,202 | Milligan | June 28, 1932 |
| 2,094,945 | Hesselrode | Oct. 5, 1937 |